Figure 1:
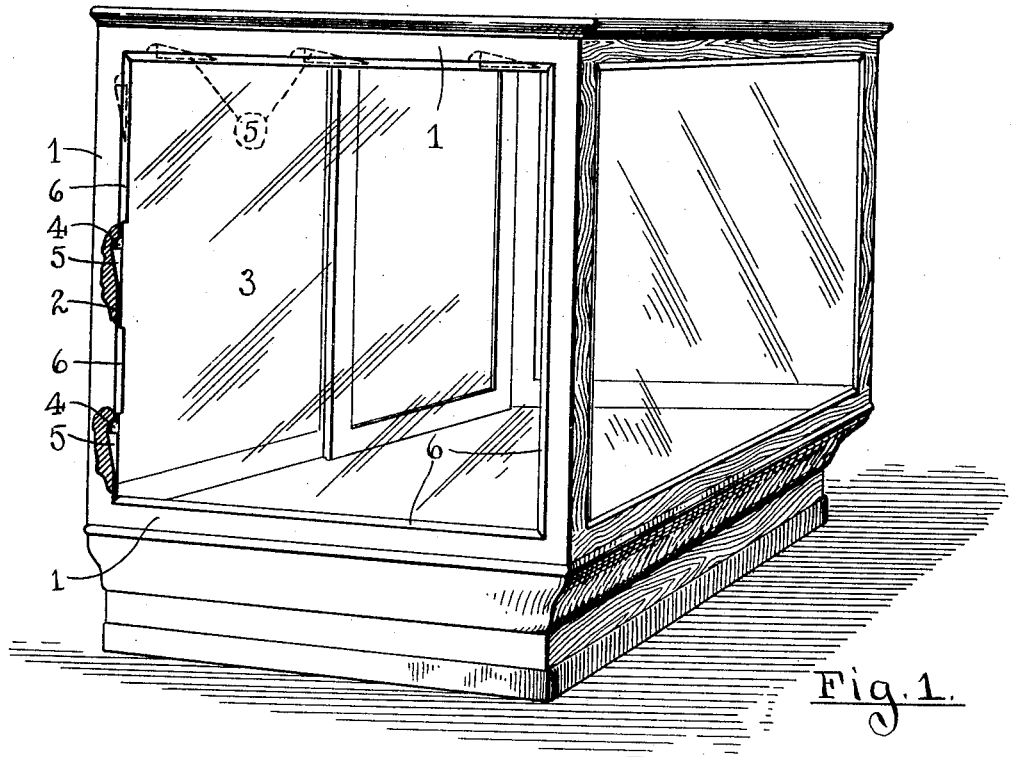

E. MORRIS.
GLASS LOCKING DEVICE FOR SHOW CASES.
APPLICATION FILED JULY 5, 1913.

1,086,392.

Patented Feb. 10, 1914.

Witnesses
Harold O. Van Antwerp.
Mae Rankin

Inventor
Edmund Morris.
By Luther V. Moulton
Attorney.

COLUMBIA PLANOGRAPH CO., WASHINGTON, D. C.

UNITED STATES PATENT OFFICE.

EDMUND MORRIS, OF GRAND RAPIDS, MICHIGAN, ASSIGNOR TO WILMARTH SHOW CASE COMPANY, OF GRAND RAPIDS, MICHIGAN, A CORPORATION OF MICHIGAN.

GLASS-LOCKING DEVICE FOR SHOW-CASES.

1,086,392.   Specification of Letters Patent.   Patented Feb. 10, 1914.

Application filed July 5, 1913. Serial No. 777,463.

*To all whom it may concern:*

Be it known that I, EDMUND MORRIS, a citizen of the United States of America, residing at Grand Rapids, in the county of Kent and State of Michigan, have invented certain new and useful Improvements in Glass-Locking Devices for Show-Cases; and I do hereby declare the following to be a full, clear, and exact description of the invention, such as will enable others skilled in the art to which it appertains to make and use the same.

My invention relates to improvements in glass locking devices for show cases and the like, and its object is to provide a device by means of which the glass in a show case or like structure may be firmly wedged into place, to provide a device of this class which will be simple in construction, effective in operation, and to provide the same with certain new and useful features hereinafter more fully described and particularly pointed out in the claims.

It is customary in fitting glass into show case frames and similar structures to cut the glass slightly smaller than the opening to receive it for the reason that it is difficult to cut the glass to exactly fit such opening, and even if this should be done it would be somewhat difficult to insert the glass into place. The frames in which the glass is mounted are generally lightly constructed and are not substantial enough in themselves to withstand the strain to which they are subjected as forming a part of the show case structure, and the builder depends upon the strength and rigidity of the glass after being placed in the frame to aid in maintaining the same in its proper shape and to bear a portion of the strain put upon the case.

Following the above mentioned custom of cutting the glass smaller than the opening in the frame to receive it, it is desirable to provide some means by which the loosely fitting glass may be wedged firmly into place in the frame. Various means have heretofore been utilized to accomplish this, such as filling the open space between the frame and the glass with putty, using certain eccentric cam devices to engage the edge of the glass, etc. These have been unsatisfactory, in that, they were either inefficient or too expensive for practical use.

This invention provides a simple, cheap and effective device to accomplish the desired effect of wedging the glass firmly into place in the frame by means of small wedges placed in recesses in the rabbet in the frame which receives the glass. These recesses are located at the base of the rabbet so that the wedges therein will engage the edge of the glass when it is in operative position and have inclined bottom surfaces which the wedges engage. These recesses are preferably provided only in two adjacent sides of a rectangular frame and the wedges therein will force the glass away from these sides against the other two sides.

Figure 2:
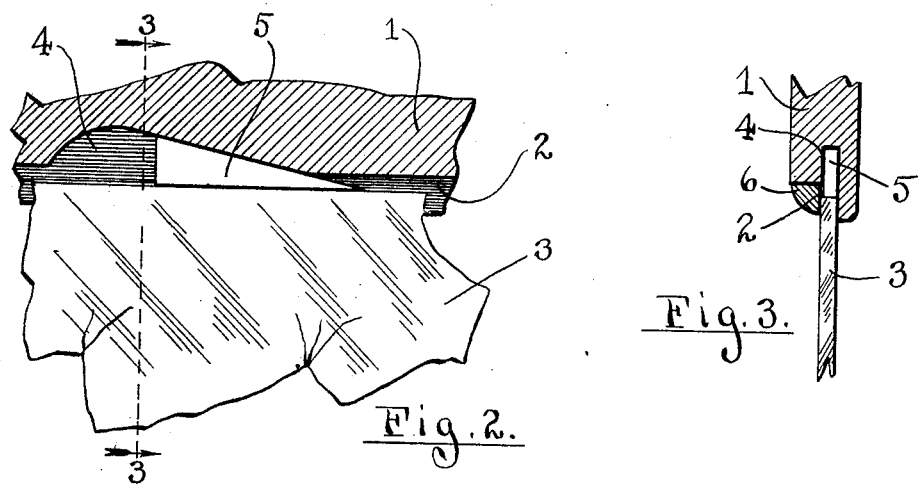
Figure 3:
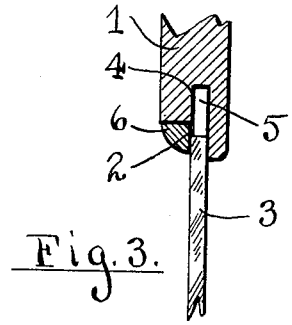

The preferred construction and arrangement of the device will more fully appear by reference to the accompanying drawings in which:

Figure 1 is a perspective view of a show-case having my improved glass locking devices applied thereto; Fig. 2 is an enlarged detail of a portion of a frame and piece of glass showing a recess and wedge in operative position; and Fig. 3 is a transverse section of the same on the line 3—3 of Fig. 2.

Like members refer to like parts in all of the figures.

1 represents the frame of a showcase which is rabbeted as at 2, to receive the glass 3. Recesses 4 are provided at intervals in the rabbet opposite the edge of the glass, preferably upon only two sides of the frame, such as the top and one vertical side as shown, and these recesses have inclined bottom surfaces which merge at one end into the rabbet. Each recess is provided with a small wedge 5, approximately the thickness of the glass, the angle of the inclined surfaces of these wedges being the same as the angle of the inclined bottoms of the recesses. The broad ends of the wedges are slightly wider than the extreme depth of the recesses, so that when the wedges are placed in the recesses they will project slightly beyond the surface of the rabbet.

In using these glass locking devices, the wedges 5 are placed in the recesses 4, after first coating their surfaces with glue, and this coating of glue serves to retain them within the recesses, while the glass is being inserted. The glass is then placed in the frame, leaving a small space between its edge and the surface of the rabbet which enables the workman to insert a small tool to engage the broad end of the wedge, and by means of said tool the wedge is moved along the inclined surface of the recess until the glass is forced firmly against the opposite side of the frame. This operation is performed upon each of the wedges and the glue with which they are coated dries and holds them in position. The open space thus formed between the edge of the glass and the surface of the rabbet is covered by a strip of molding 6, which also obscures the locking devices and gives a finished appearance to the case.

What I claim is:—

1. A structure, comprising a frame to receive a panel and provided with a recess in the frame opposite the edge of the panel, and a wedge in the recess to engage the edge of the panel to hold the same rigidly in place.

2. Means for locking glass panels in frames, comprising a frame having inclined recesses opposite the edges of the glass and wedges in the recesses to engage the edges of the glass.

3. Means for locking glass panels in frames, comprising a frame rabbeted to receive the glass and having inclined recesses opposite the edges of the glass and wedges in the recesses to engage the edges of the glass, the extreme width of such wedges being greater than the extreme depth of the recesses.

In testimony whereof I affix my signature in presence of two witnesses.

EDMUND MORRIS.

Witnesses:
 HAROLD O. VAN ANTWERP,
 MAE RANKIN.

---

Copies of this patent may be obtained for five cents each, by addressing the "Commissioner of Patents, Washington, D. C."